United States Patent [19]

Kawashima

[11] Patent Number: 5,296,940
[45] Date of Patent: Mar. 22, 1994

[54] IMAGE PROCESSING METHOD AND APPARATUS FOR CONVERTING GRAY-SCALE IMAGES INTO BINARY IMAGES

[75] Inventor: Sumihiko Kawashima, Ootsu, Japan

[73] Assignee: Toyo Boseki Kabushiki Kaisha, Osaka, Japan

[21] Appl. No.: 686,626

[22] Filed: Apr. 18, 1991

[30] Foreign Application Priority Data

Apr. 18, 1990 [JP] Japan ................... 2-104047

[51] Int. Cl.$^5$ ............................................. H04N 1/40
[52] U.S. Cl. .................... 358/455; 358/456; 382/51
[58] Field of Search ............... 358/455, 456, 465, 466; 382/51; H04N 1/40

[56] References Cited

U.S. PATENT DOCUMENTS

| | | | |
|---|---|---|---|
| 4,593,325 | 6/1986 | Kannapell et al. | 358/455 |
| 4,656,665 | 4/1987 | Pennebaker | 358/466 |
| 4,695,884 | 9/1987 | Anastassiou et al. | 382/51 |
| 4,710,822 | 12/1987 | Matsunawa | 358/466 |
| 4,977,605 | 12/1990 | Fardeau et al. | 382/51 |
| 5,065,444 | 11/1991 | Garber | 382/51 |
| 5,133,022 | 7/1992 | Weideman | 382/51 |

FOREIGN PATENT DOCUMENTS 0057572 4/1984 Japan ................... 358/455

*Primary Examiner*—Edward L. Coles, Sr.
*Assistant Examiner*—Jill Jackson
*Attorney, Agent, or Firm*—Wegner, Cantor, Mueller & Player

[57] ABSTRACT

A method and an apparatus for converting the gray images inputted from the image pickup elements into binary images without losing the shape information of the gray images. The image processing method comprises the steps of obtaining the maximum values and the minimum values of the density for each horizontal scanning line and each vertical scanning line of the inputted images, obtaining the threshold values from the adjacent maximum values and minimum values, obtaining the two type binary images for each horizontal scanning line and each vertical scanning line with the threshold values, obtaining the composed binary images with the logical product or the logical sum between the respective pixels of the above two type binary images.

7 Claims, 11 Drawing Sheets

IMAGE PROCESSING METHOD AND APPARATUS FOR CONVERTING GRAY-SCALE IMAGES INTO BINARY IMAGES

BACKGROUND OF THE INVENTION

The present invention generally relates to a method and an apparatus for converting the gray images inputted from image pickup elements, for example CCD camera, into binary images.

In order to analyze the shape of images, the gray images are normally changed with the binary images.

In order to make the binary images, a threshold value for the images is selected, and when the density of the pixel of the image is larger than the the threshold value, the pixel is white (or black), and the others are black (or white). When the same threshold value is applied with respect to the all pixels of the gray images, the shape information of the original gray images often becomes inappropriate in the conversion into the binary images.

This fact is because the density information of the gray images has normally 256 gradations, but that of the binary images has only two gradations. This is the reason why the shape information of the binary images becomes inappropriate to lose the shape information of gray images. In order to prevent such shape information loss, it is conventionally proposed that the processing of emphasizing the contrasts of the images should be effected before the binary processing or the way of the lighting should be devised to input the images into the image pickup elements.

But the converting the gray images into the binary images is often insufficient, even when the contrasts of the images are emphasized in processing or when the lighting is devised. A representative example in the application of the conventional binary processing will be described in FIG. 13.

Figure 13:
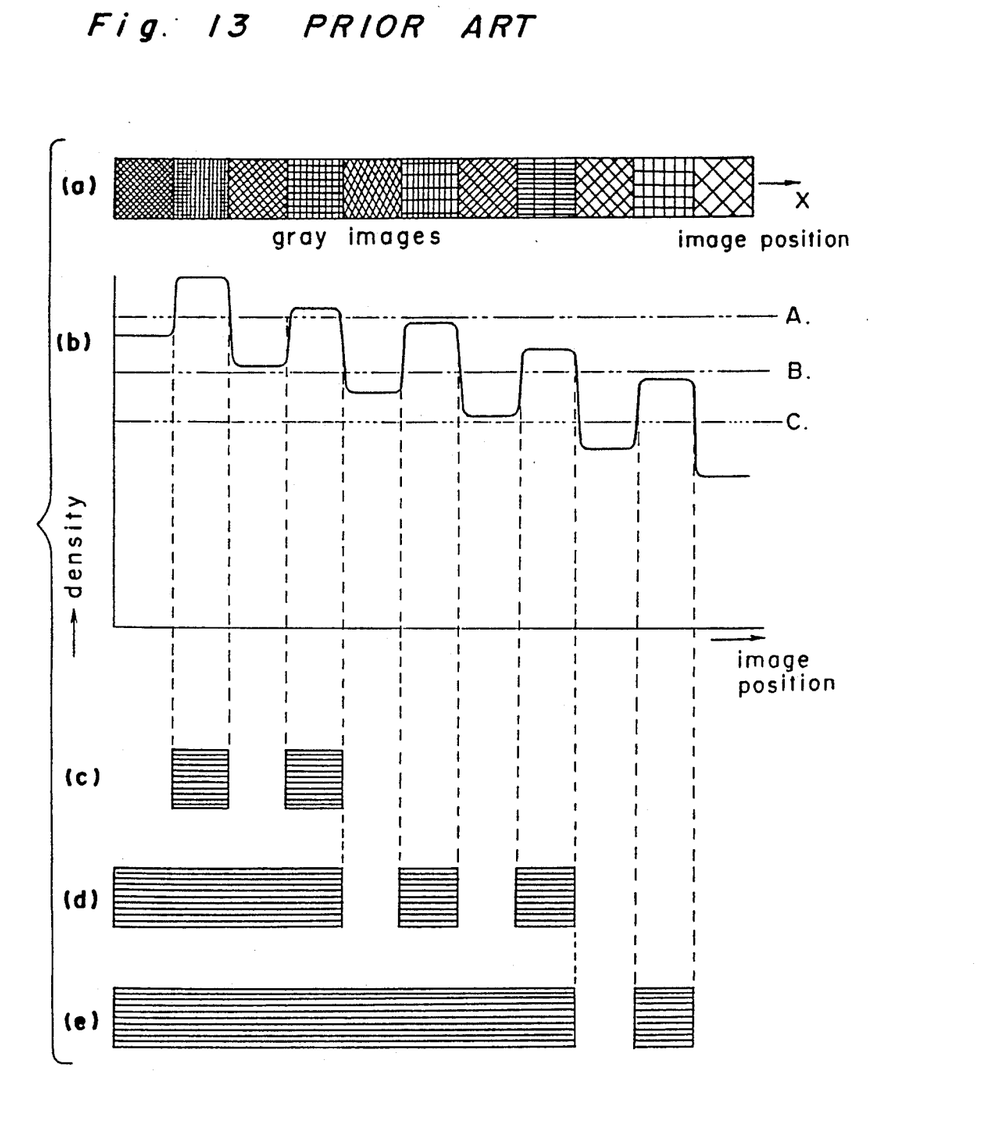

In FIG. 13, the (a) is an abbreviated figure of the gray images inputted from the image pickup elements. The (b) thereof is a 1-dimensional density histogram in the X—X (horizontal). The (c), (d), (e) thereof are abbreviated figures showing the binary images when the respective threshold values are at the time of A, B, C.

It is found out from the embodiment of FIG. 13 that the shape information of the original gray images in the conventional binary processing is lost, so that it is not made binary images properly.

If the shape information of the binary images is not sufficient, it is found out that the analyses using the binary images do not become proper.

SUMMARY OF THE INVENTION

Accordingly, an essential object of the present invention is to provide an image processing apparatus and a method for properly making the binary images from the gray images.

Another important object of the present invention is to provide a binary image detecting method or an apparatus for it, which is strong against the noises without losing the shape information of the gray images inputted from the image pickup elements.

The present invention is a method of converting the gray images into the binary images. This image converting method comprises the steps of obtaining maximal values and minimal values of the density for each of horizontal scanning lines or each of vertical scanning lines of the inputted gray images, obtaining the threshold values by the adjacent maximal values and minimal values from the adjacent maximal to minimal value positions, obtaining the binary images with the threshold values being provided as the threshold values of the images from the adjacent maximal value positions to minimal value positions. Also, the present invention is an image processing apparatus having at least a mechanism of converting the gray images into the binary images. The image processing apparatus has a mechanism which is adapted to obtain the maximal values and the minimal values of the density of the images for each horizontal scanning line or each vertical scanning line in the image processing operation, obtain the threshold values by the adjacent maximal and minimal values from the adjacent maximal to minimal value positions, obtain the binary images with the threshold images being provided as the threshold values of the images from the adjacent maximal to minimal value positions.

Also, the present invention is a method of converting the gray images into the binary images. The image processing method comprises the steps of obtaining the maximal values and the minimal values of the density of the images for each horizontal scanning line and each vertical scanning line of the inputted images, obtaining the threshold values by the adjacent maximal and minimal values from the adjacent maximal to minimal value positions, obtaining the two type binary images for each horizontal scanning line and each vertical scanning line with the threshold values being provided as the threshold values of the images from the adjacent maximal to minimal value positions, obtaining the binary images obtained by image composition, AND or OR composition of above two type binary images. The invention is an image processing apparatus which has at least a mechanism for converting the gray images into the binary images. The image processing apparatus has a mechanism of obtaining the maximal values and the minimal values of the density of the images for each horizontal scanning line and each vertical scanning line, obtaining the threshold values by the adjacent maximal and minimal values from the adjacent maximal to minimal value positions, obtaining the two type binary images for each horizontal scanning line and each vertical scanning line with the threshold values being provided as the threshold values of the images from the adjacent maximal to minimal value positions, obtaining the binary images with the image composition, AND or OR composition of above two type binary images.

Further, the present invention is a method of converting the gray images into the binary images. This method comprises at least the steps of obtaining the maximal values and minimal values of the density of the images for each horizontal scanning line and (or) each vertical scanning line, obtaining the difference ($\Delta a$) between the adjacent maximal values and the minimal values, composing the histogram of the difference ($\Delta a$), setting the critical value (valley point: $C_T$) of the histogram, obtaining the adjacent maximal and minimal values where the $\Delta a$ is larger than the $C_T$, obtaining the threshold values with the above adjacent maximal and minimal values, obtaining the binary images with the threshold values being provided as the threshold values of the images from the adjacent maximal to minimal value positions. The present invention is an apparatus of converting the gray images into the binary images. This apparatus has at least a mechanism for obtaining the maximal values and the minimal values of the density of the images for each horizontal scanning line and (or)

each vertical scanning line, composing the histogram of the absolute value (Δa) of the difference between the adjacent maximal value and minimal value, setting the critical value (valley point: $C_T$) of the histogram.

BRIEF DESCRIPTION OF THE DRAWINGS

These and other objects and features of the present invention will become apparent from the following description taken in conjunction with the preferred embodiment thereof with reference to the accompanying drawings, in which:

FIG. 3(a) shows a gray image model, (b) shows the relationship between the density histogram on one horizontal scanning line and the threshold value obtained by the present invention, (c) shows the binary image obtained by thresholding.

FIGS. 4(a)-(e) is a chart showing the binary image processing by the processing of the present invention which has a logical product and a logical sum;

FIGS. 13(a)-(e) shows the description similar to FIG. 3 in the conventional method.

DETAILED DESCRIPTION OF THE INVENTION

Before the description of the present invention proceeds, it is to be noted that like parts are designated by like reference numerals throughout the accompanying drawings.

First Embodiment

Figure 1:
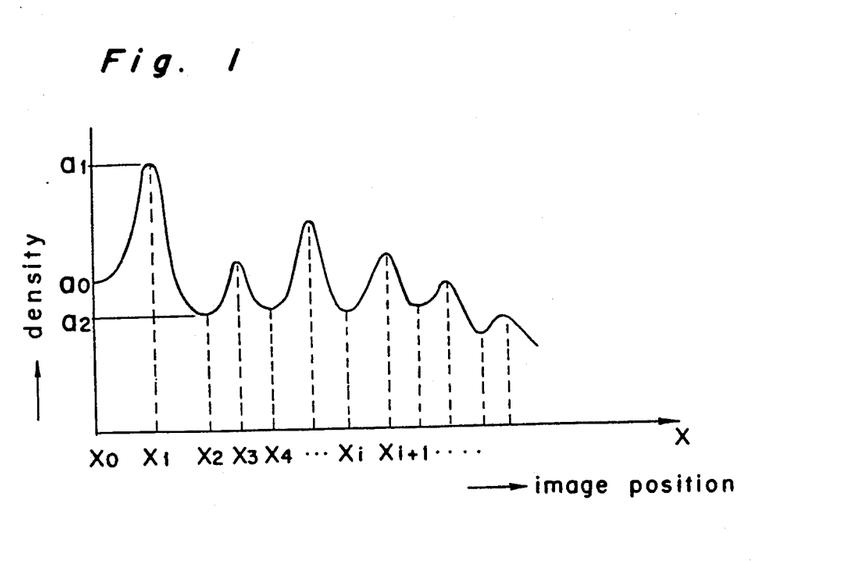
FIG. 1 is a graph showing a 1-dimensional density histogram on one horizontal scanning line of the gray images.

A first embodiment of the present invention with the use of FIG. 1, FIG. 2, FIG. 3, FIG. 8. FIG. 1 shows a 1-dimensional density histogram in one horizontal scanning line inputted by the image pickup elements, wherein X1, X2, X3, . . . , Xi, Xi+1, . . . show the positions of the images in relationship with the density values which have extremal values. Assume that the density values in the X1, X2, X3, Xi, Xi+1 are a1, a2, a3, . . . , a1, ai+1, and the threshold value (THL) between the picture element (pixel) positions of the Xi through Xi+1 (i=0, 1, 2 . . . ) is decided by the following formula (1). The a1, a2, . . . are the noise free residual values after eliminating the noise.

$$\begin{aligned} &\text{At the time of } ai + 1 \geq ai, \\ &THL = K(ai + 1 - ai) + ai \\ &\text{At the time of } ai + 1 < ai \\ &THL = K(ai - ai + 1) + ai + 1 \end{aligned} \right\} \quad (1)$$

wherein K is a constant of 0 through 1.

The various methods of obtaining the threshold values including elements at the ends of the horizontal scanning lines are considered as follows.

a) A method of using the threshold value obtained from the (1) formula with the use of the density value a0 of the pixel (shown with X0 in FIG. 2) of the end.

b) A method of using the threshold value closest in distance to the pixel of the end for each horizontal scanning line.

c) A method of keeping the threshold value fixed in advance.

According to the experiments, the better results are obtained by the above described a) or b).

Before above described analysis is effected, the previous processing is normally performed to effect the noise removing operation. Therefore, the above described analysis is effected with the noise removed gray images being provided as a premise.

The threshold value THL with the use of the (1) formula for each horizontal scanning line is obtained in this manner. The pixels which have the density larger than the threshold value THL obtained in the respective region are made white (or black), and the other pixels are made black (or white). The gray images are converted into the binary images in this manner.

Figure 2:
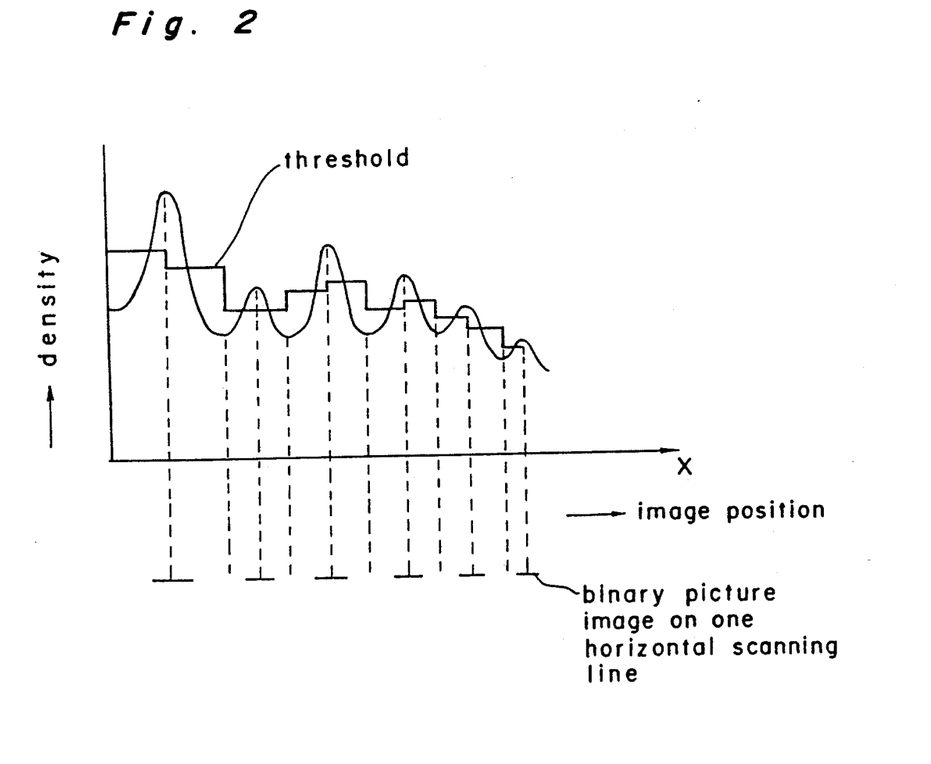
FIG. 2 shows the relationship between the density histogram shown in FIG. 1 and the threshold value to be obtained by the present invention method, and the binary images determined by the threshold value at that time.

In FIG. 1, the binary images are obtained as in FIG. 2 if the (1) formula is applied as K=0.5 in FIG. 1.

Figure 3:
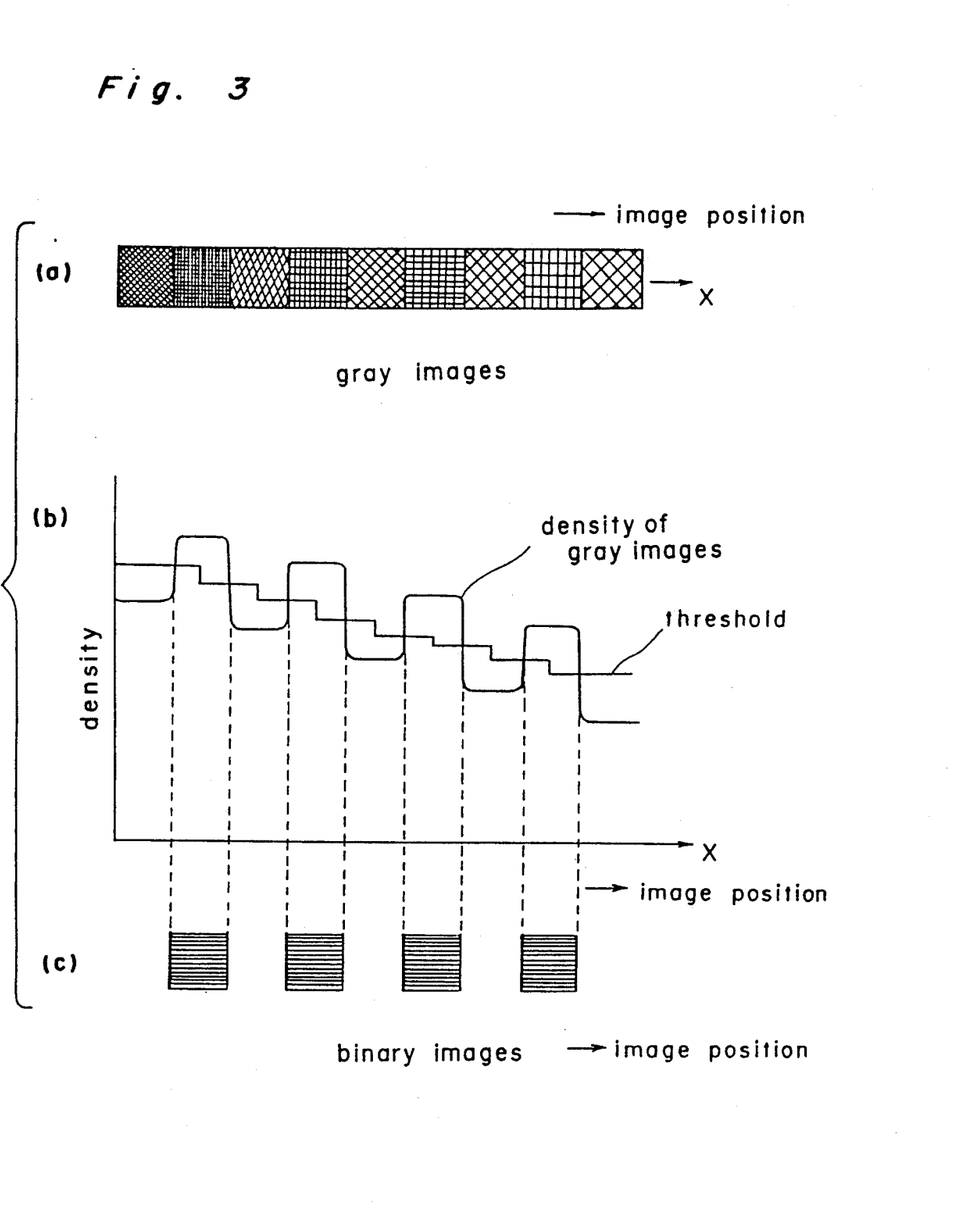

When the present invention is applied as K=0.5 with respect to the images of FIG. 13, it is provided as in FIG. 3.

It is found out from FIG. 2 and FIG. 3 that the threshold value is fluctuated by the density value around the image, so that the threshold value becomes high if the density is high, and the threshold value becomes low if the density is low. The threshold value is fluctuated by the density value around the image. The similar things are effected as when the human being judges the boundary of the image. From the above description, it is found out that the binary image is obtained without losing the shape information of the gray image as compared with the conventional method if the present invention is used.

The threshold values THL are obtained for each horizontal scanning line or each vertical scanning line. The pixels which have the density larger than the threshold value THL in the respective region Xi through Xi+1 (i=0, 1, 2, . . . ) are made white (or black), and the other pixels are made black (or white). As a result, the binary image one by one is obtained respectively with respect to the horizontal scanning line.

According to the present invention, good binary images are obtained without lose of the shape information of gray images as compared with the conventional method. The above description is also applied to the vertical scanning line.

Figure 8:
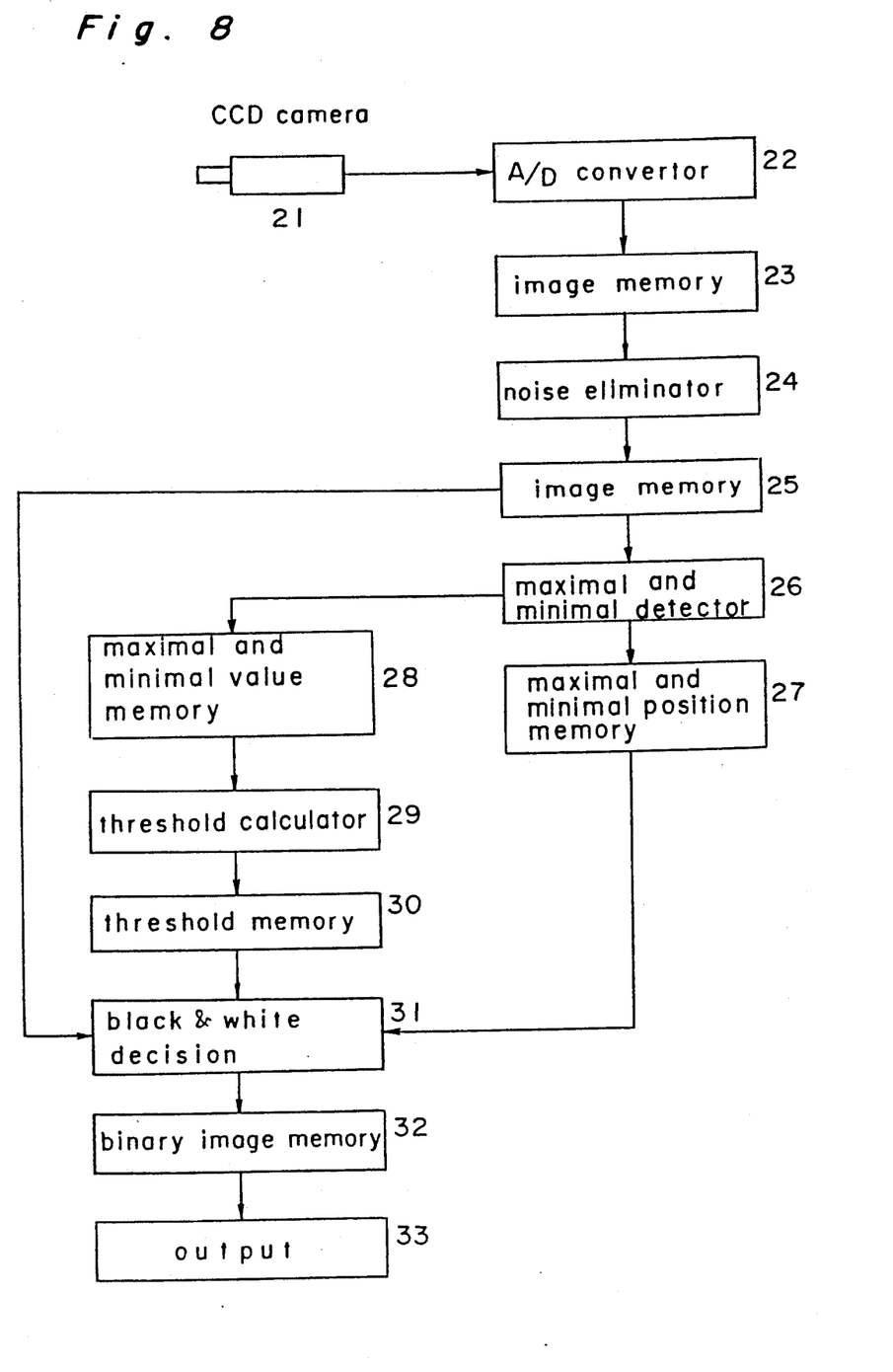
FIG. 8 shows a schematic diagram of the arrangement of each circuit (element) in the embodiment of one example of the present invention.

The construction of a first embodiment of the present invention will be described with the use of FIG. 8. The gray images inputted from a CCD camera 21 are converted in the density from analog values to digital values by an A/D converting circuit 22, and are stored in the image memory circuit 23. As the gray images in the image memory circuit 23 include noises, it pass through a noise removing circuit 24 and are stored in the image memory circuit 25 as the clean images which are free from the noises.

The values and positions of the maximal and minimal of the gray image density are detected by the maximal and minimal detector circuit 26 from the gray image data of the image memory circuit 25. The detected maximal and minimal values and positions are respectively stored in the maximal and minimal value memory circuit 28 and the maximal and minimal position memory circuit 27.

These values go to a threshold calculator circuit 29 from the data of maximal and minimal value memory circuit 28 to effect the operation of the (1) formula. The threshold values are obtained and are stored in the threshold memory circuit 30.

In a white and back deciding circuit 31, the gray images are converted into the binary images from the gray image data from the image memory 25, the threshold values from the threshold memory circuit 30, and the position data of the maximal and minimal from the maximal and minimal position memory circuit 27. The converted binary images are stored in a binary image memory circuit 32 and are outputted from an output circuit 33 when necessary.

According to the first embodiment of the present invention, the good binary images are obtained without lose of the shape information of gray images as compared with the conventional method, so that the analyzing result using the binary images make good.

Second Embodiment

Figure 9:
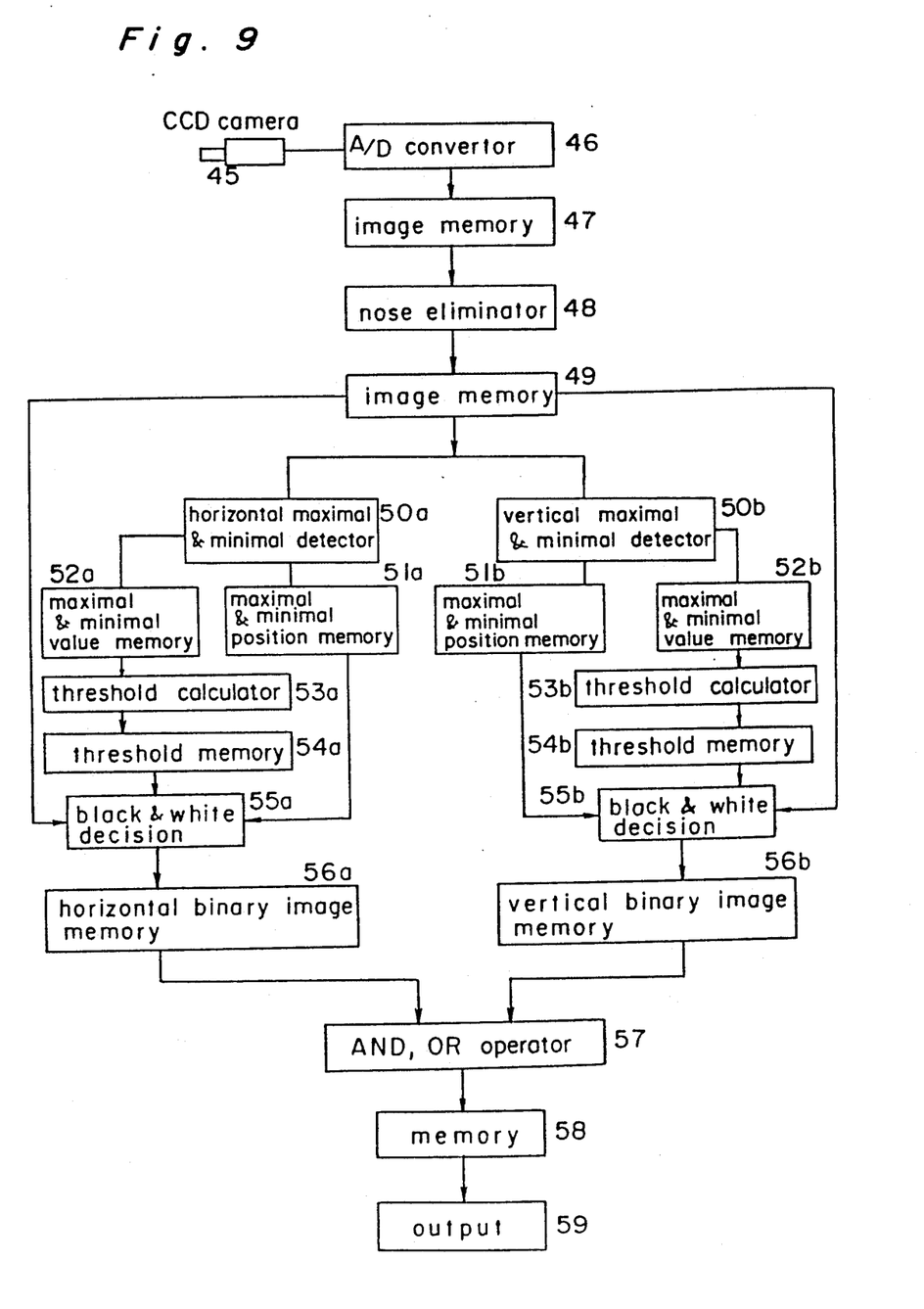
FIG. 9 shows a schematic diagram of the arrangement of each circuit (element) of a second embodiment of the present invention.

A second embodiment of the present invention will be described hereinafter with the use of FIG. 4 and FIG. 9.

As described in the first embodiment, the binary images are obtained as in FIG. 2 when the (1) formula is applied as K=0.5 in FIG. 1. Also, it is provided as in FIG. 3 when the present invention is applied as K=0.5 with respect to the images of FIG. 13.

The threshold value THL is obtained for each horizontal scanning line or each vertical scanning line. The pixels which have the density larger than the threshold value THL in the respective region Xi through Xi+1 (i=0, 1, 2, ...) are made white (or black), and the other pixels are made black (or white). As a result, the binary image is obtained one by one respectively with respect to the horizontal or vertical scanning line.

The composed binary images can be obtained by the logical product (AND) or the logical sum (OR) between the corresponding pixels of the binary images obtained by the result of the thresholding with respect to the horizontal and vertical scanning line. The composed binary images are obtained as follows with the background being 0, and the image being 1.

$$a_{ij} \times b_{ij} = c_{ij} \quad \begin{matrix} i = 1, 2, \ldots N \\ j = 1, 2, \ldots M \end{matrix} \quad (2)$$

$$a_{ij} + b_{ij} = c'_{ij} \quad \begin{matrix} i = 1, 2, \ldots N \\ j = 1, 2, \ldots M \end{matrix} \quad (3)$$

wherein $c_{ij}$ is a binary image of the logical product, $c'_{ji}$ is a binary image of the logical sum, $a_{ij}$ is a binary image obtained by the horizontal scanning, $b_{ij}$ is a binary image obtained by the vertical scanning, $c_{ij}$, $c'_{ij}$ is a binary image to be obtained by the taking the logical product, the logical sum of the binary images, N, M are respectively the number of the pixels of the horizontal direction, the vertical direction.

The effect to be obtained by the taking of the above described logical product, logical sum will be described with the use of FIG. 4.

Figure 4:
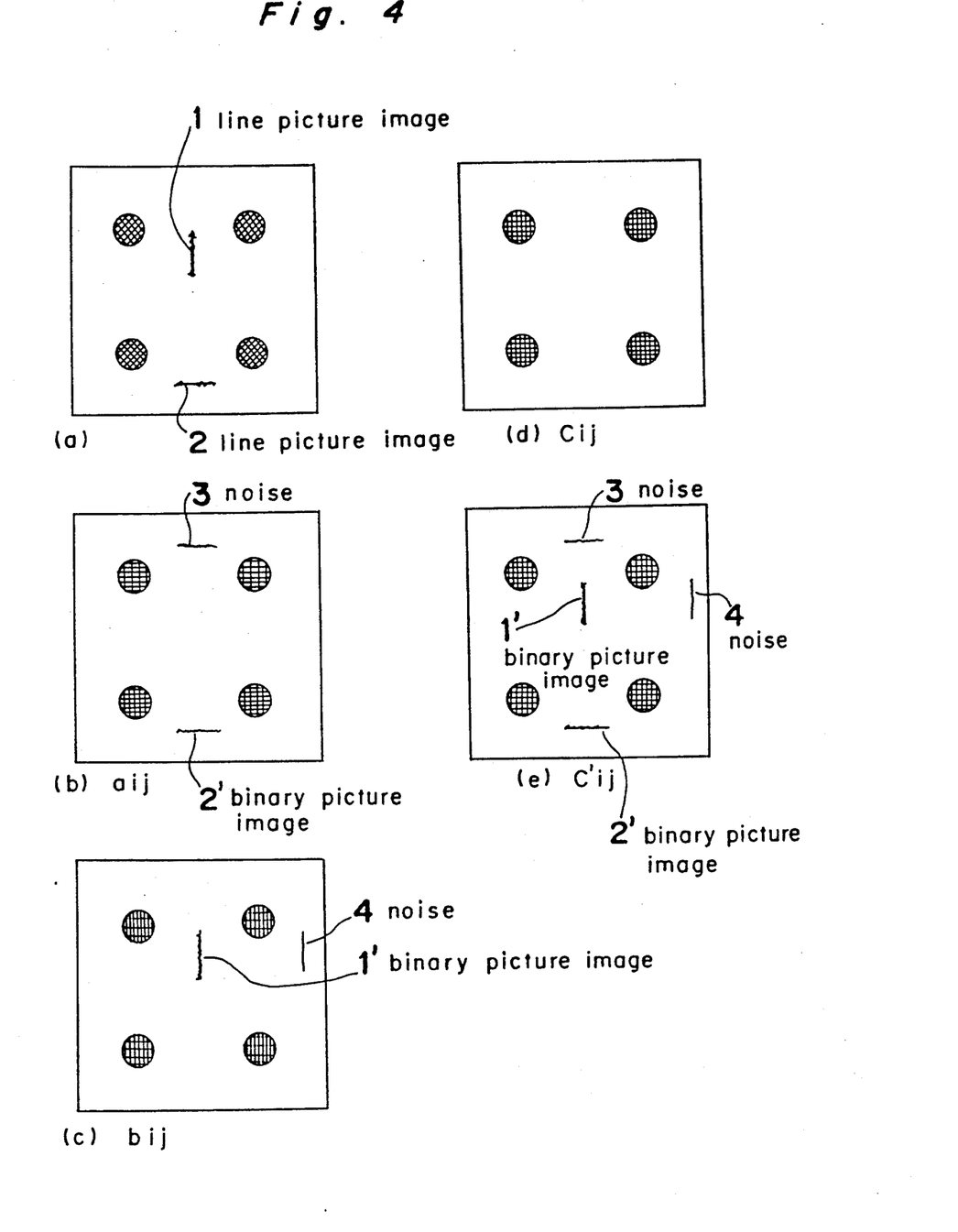

In FIG. 4, the (a) is a gray image picture inputted from the image pickup element, the (b) is a binary image picture obtained from the horizontal scanning, the (c) is a binary image picture obtained by the vertical scanning, the (d) is a binary image picture obtained from the logical product of the images of the (b) and (c), (e) is a binary image picture obtained by the logical sum of the images of the (b) and (c).

In FIG. 4, the reference numerals (1), (2) are linear images having the contrast near the noise level, the reference numerals (1)', (2)' are the binary images thereof, the reference numerals (3), (4) are noises caused in the conversion into the binary images.

The binary image picture of the (b) obtained by the scanning in the horizontal direction is normally high in the sensitivity with respect to the horizontal direction, so that such noises in the horizontal direction as shown in the (3) are likely to be picked up. The sensitivity in the vertical direction becomes lower as compared with the sensitivity in the horizontal direction. The linear image (1) having the contrast near the noise level is hard to detect.

In the case of the binary image picture of the (c) obtained by the scanning in the vertical direction, the sensitivity in the vertical direction becomes higher, the sensitivity in the horizontal direction becomes lower, inversely to the case of the scanning in the horizontal direction.

Therefore, such binary image picture as shown in the (c) is obtained.

The image $c_{ij}$ obtained by the taking of the logical product of the binary image $a_{ij}$ and the $b_{ij}$ becomes a clean image free from the noises (3), (4), but loses the information of the linear image having the contrast near the noise level. When the logical sum of the binary images $a_{ij}$ and $b_{ij}$ has been taken, the obtained image $c'_{ij}$ does not lose the information of the linear image having the contrast near the noise level, with the noises (3), (4) remaining without being removed.

By taking the logical product, the shape information of the linear image with the contrast being bad is lost, but the clean binary image free from the noises is obtained. When the logical sum is taken, the binary image is obtained without losing the shape information of the linear image with the contrast being bad, with the noise remaining without being eliminated.

The binary images obtained by taking of the logical product and the logical sum respectively have one advantage and another disadvantage. But the binary images may be very effectively processed by the separate use when occasion demands. In generally, the logical product is used for taking the clean binary images, and the logical sum is used for taking more detail shape information.

The construction of a second embodiment of the present invention will be described with the use of FIG. 9.

The gray images inputted from a CCD camera 45 are converted in the density from the analog value to the digital value by the A/D converting circuit 46, and are stored in the image memory circuit 47. As the gray images of the image memory circuit 47 include the noises, they pass through a noise removing circuit 48 to take the clean images free from the noises, and store them in the image memory circuit 49. The values and positions of the maximal and minimal of the gray image density are detected by the maximal and minimal detector circuit 50a, 50b from the gray image data of the image memory circuit 49. Vertical maximal and minimal detector 50b detects the values and positions of vertical direction, and the horizontal maximal and minimal detector 50a detects the values and positions of horizontal director. These detected values of maximal and minimal are stored respectively in the maximal and minimal value memory 52a, 52b, and the positions of maximal and minimal are stored in the maximal and minimal position memory 51a, 51b.

The operation of the (1) formula is effected by the threshold calculator circuits 53a, 53b from the data of the maximal of minimal value memory circuits 52a, 52b to obtain the threshold values to store in the threshold memory circuits 54a, 54b. In the black and white decision circuits 55a, 55b, the gray images are converted into the binary images from the gray image information from the image memory 49, the value of the threshold value from the threshold memory circuits 54a, 54b, and the positional information of the maximal and minimal from the maximal and minimal position memory 51a, 51b. The converted binary images are stored into the horizontal binary image memory circuit 56a, and the vertical binary image memory circuit 56b.

In the AND, OR operator circuit 57, the operation of the (2) formula or (3) formula is effected in accordance with the binary image information from the horizontal binary image memory circuit 56a, and the binary image information from the vertical binary image memory circuit 56b so as to obtain the binary images. They are stored by the memory circuit 58, and are outputted from the output circuit 59 when necessary.

Figure 12:
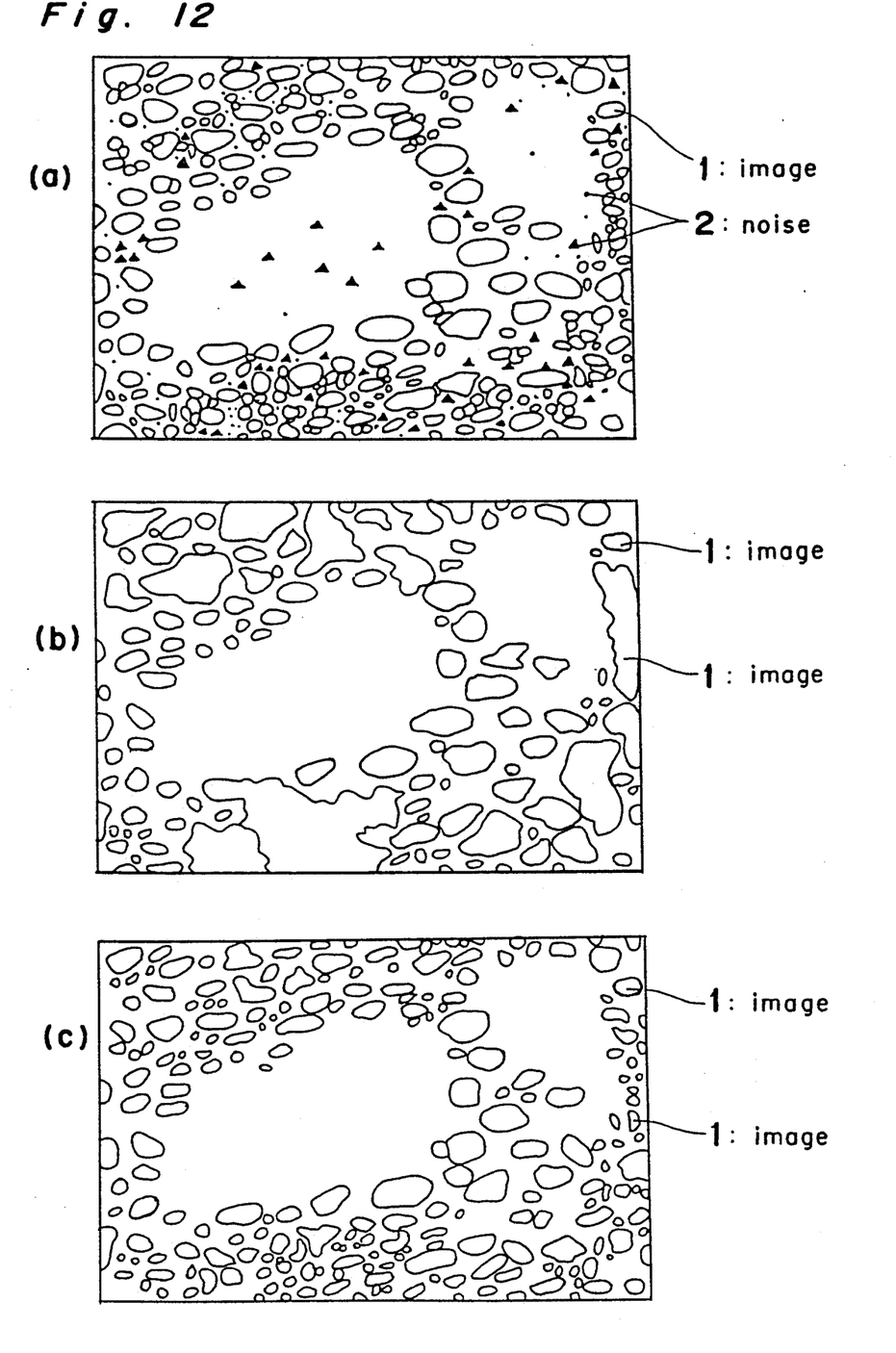
FIG. 12 respectively shows the summary of the gray images in the (a) thereof, of the binary images by the thresholding of the conventional method in the (b) thereof, of the binary images by thresholding of the present invention in the (c) thereof.

The actual application example by the second embodiment is shown in FIG. 12.

FIG. 12(a) shows a schematic view of the gray images the CCD camera took in. FIG. 12(b) shows a schematic view of the binary image, wherein a discriminating analysis method is used in the present embodiment, by the conventional binary method. FIG. 12(c) shows a schematic view of the binary images by the binary method, with the logical product being taken, of the present invention.

It is found out from FIG. 12 that in the conventional method, the image shape information of the gray images are considerably lost. In the present invention, the binary images are obtained without the shape information thereof being hardly lost.

According to the image processing of the second embodiment, the processing operation may be effected with an optional property which is superior in the noise removing, and also, can take in the images near the noises in the processing operation from the gray images into the binary images.

Third Embodiment

Figure 6:
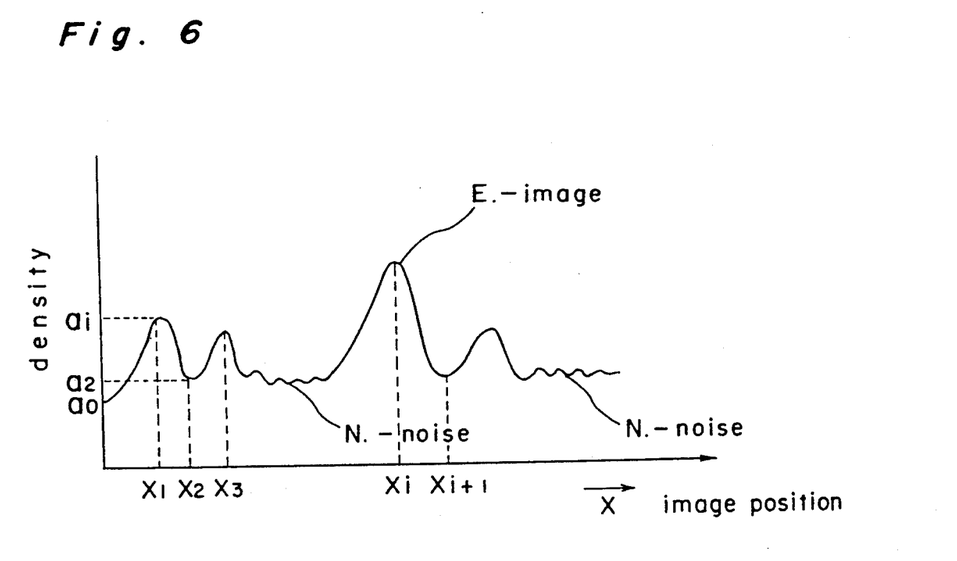
FIG. 6 is a graph showing the gray image example.

A third embodiment of the present invention will be described hereinafter with the use of FIG. 6, FIG. 7, FIG. 10, FIG. 11, FIG. 12. FIG. 6 shows 1-dimensional density histogram in the horizontal (or vertical) scanning pixels lines of the image obtained by the image pickup elements. The x1, x2, ..., xi, xi+1, ... show the positions of the pixels where the density values take the extremal values, with the density values in the x1, x2, ..., xi, xi+1, ... being a1, a2, ..., ai, ai+1, ....

When the images are taken in with the image pickup elements to make the 1-dimensional density histogram, the small difference, which is hereinafter called as contrast, between the adjacent maximal value and the minimal value, and the large difference between them exist as shown in FIG. 6. The small contrast shows noises, while the large contrast shows images. The third embodiment for a method of using the histogram of the contrast is proposed as a method of obtaining the branch point of the contrast of such noises and the images.

Normally the contrast of the noises and the images may be clearly divided.

Figure 7:
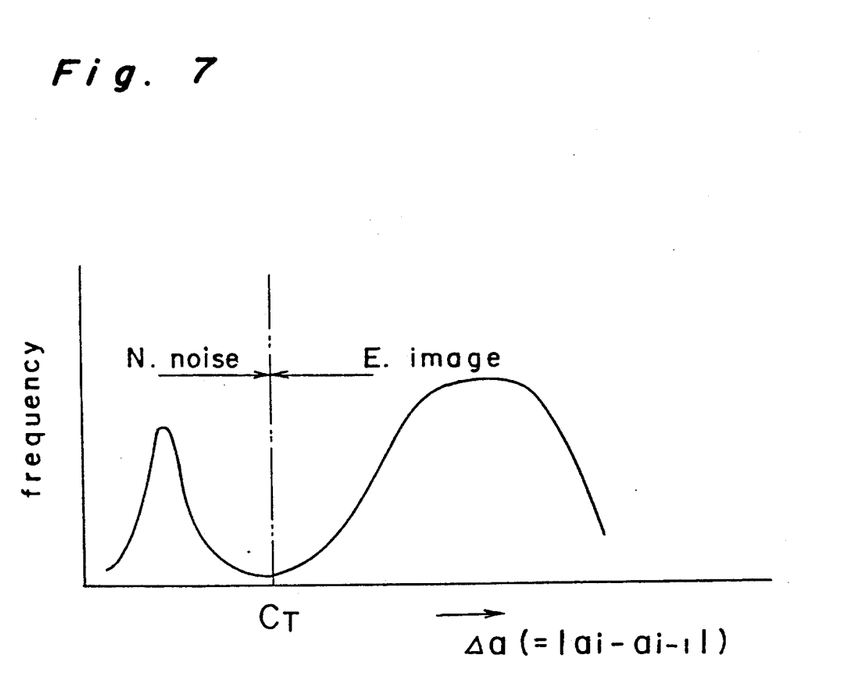
FIG. 7 is a graph showing the histogram of the absolute value of the difference between the adjacent maximal value and minimal value.

Therefore, the histogram of the contrast has the double-humped property as shown in FIG. 7.

In FIG. 7, the smaller one than the value $C_T$ of a valley point shows the noises, while the larger one shows the contrast of the images.

The following three types are proposed by a method of selecting the sample as a method of obtaining the contrast branch point $C_T$ of the noises and the images from the histogram of such contrast.

(1) A method of obtaining it for each one line of the horizontal scanning lines or the vertical scanning lines. In this case, the value of $C_T$ in each one scanning line is changed.

(2) A method of obtaining it from the whole of the horizontal scanning direction or of the vertical scanning direction. In this case, the value of $C_T$ becomes fixed in each scanning direction.

(3) A method of obtaining it from the whole of the horizontal scanning direction and the vertical scanning direction. In this case, the value of the $C_T$ in the horizontal, vertical scanning directions becomes a single value.

Although the above described method respectively has one advantage and another disadvantage, the method of the (3) is better when the processing time is required to be shortened.

The method of deciding the threshold value THL will be described hereinafter.

In FIG. 6, the extremal value which satisfies the (4) formula $$|ai+1-ai| \leq C_T \, i=1, 2, \ldots \qquad (4)$$

shows the noises,

The extremal value which satisfies the (5) formula $$|ai+1-ai| > C_T \, i=1, 2, \ldots \qquad (5)$$

shows the images.

When only the extremal values which satisfy the (5) formula are extracted from the extremal values of a1, a2, ..., they are a1', a2', ..., and the positions of the pixels corresponding to the density values of a1', a2', ... become x1', x2'. ...

The threshold values THL from the xi' to xi'+1 (i=1, 2, ...) between the adjacent extremal values are decided by the following formula.

$$\left.\begin{array}{l} \text{At the time of } a'i + 1 \geq a'i, \\ THL = K(a'i + 1 - a'i) + a'i \\ \text{At the time of } a'i + 1 < a'i, \\ THL = K(a'i - a'i + 1) + a'i + 1 \end{array}\right\} \quad (6)$$

wherein K is a constant from 0 to 1.

Figure 5:
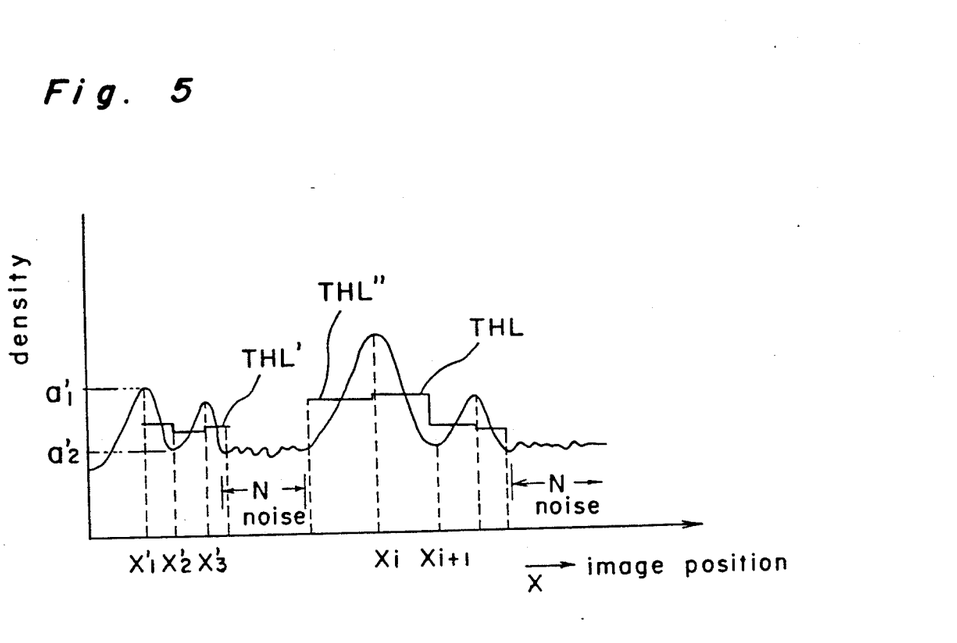
FIG. 5 is a graph showing the threshold value with one example of the present invention being applied to the gray image example.

For example, when the (6) formula is applied as K=0.5 in FIG. 6, FIG. 5 is provided.

In FIG. 5, the threshold values in a region considered noises are not obtained. The threshold value of such a region is decided from the threshold value of that near region. For example, the threshold value of the region of N of FIG. 5 is decided by either of the following methods from the threshold values THL', THL" before and behind it.

1) The threshold value is assumed to be THL' or THL"
2) The threshold value is assumed to be an average value $\frac{THL' + THL''}{2}$ of the THL' and the THL"

It makes differences by images whether or not either of the above described methods is good. In the experiment results, big differences are not made.

When the present invention is applied as K=0.5 with respect to the images of FIG. 13, FIG. 3 is provided. It is found out from FIG. 5 and FIG. 3 that the threshold values are fluctuated by the density value around the images. When the density is higher, the threshold value becomes higher. When the density is lower, the threshold value becomes lower. The threshold value is fluctuated by the density value around the images. This fact is similar to the judgment by the human being about the boundary of the images. It is found out from the above description that the binary images may be obtained without the loss of the image shape information of the gray images as compared with the conventional method with the use of the present invention.

The threshold value THL is obtained for each horizontal scanning line or each vertical scanning line. The pixels which have the density larger than the threshold value THL obtained in the respective region are made white (or black), and the other pixels are made black (or white). As a result, the binary image is obtained one by one respectively with respect to the horizontal or vertical scanning line.

The present invention proposes a method of taking the logical product or the logical sum between the above described binary image as described hereinabove in addition to the method of using, as it is, the binary images obtained as described hereinabove. In this manner, the production of the clean binary images free from the noises and the production of the binary images from the unclear images may be achieved at higher levels. On the other hand, this method also has a disadvantage of longer processing time.

Therefore, it depends upon the object of the image processing whether or not the following method is applied.

A method of having the logical product, the logical sum of two sheets of images to obtain the binary images is similar to a second embodiment, may be obtained by the (2), (3) formulas of the second embodiment.

Also, the effect of having such logical product and logical sum as described hereinabove may be described with the use of FIG. 4 as in the second embodiment.

The binary images to be obtained by having of the logical product and the logical sum respectively have one advantage, another disadvantage as in the second embodiment. But the binary images may be very effectively processed by the proper use when occasion demands.

The construction of a third embodiment of the present invention will be described with the use of FIG. 10.

The gray images inputted from a CCD camera 61 are converted in the density from the analog value to the digital value by the A/D converting circuit 62, and are stored in the image memory circuit 63. The values and positions of maximal and minimal of gray images density are detected and stored by the maximal and minimal detector 64 from the gray image data of image memory circuit 63. The differences between the adjacent maximal and minimal values are obtained from the maximal and minimal data stored in maximal and minimal detector 64 by the difference detector circuit 65, the histogram of the difference is obtained by the histogram maker circuit 66, and the value $C_T$ of the valley point of the histogram is obtained by the valley detector circuit 67.

The operation of the (5) formula is effected by the comparison selector circuit 68 from the obtained $C_T$ value so as to obtain the values and positions of the maximal and minimal values related to the images. The values and positions obtained by comparison selector circuit 68 are respectively stored in the threshold operator circuit 69 and maximal and minimal position memory circuit 71. Moreover, in the threshold value operator circuit 69, the threshold values are calculated by the (6) formula from the maximal and minimal value data.

The threshold values obtained by threshold operation circuit 69 are stored in the threshold memory circuit 70. In the white and black decision circuit 72, the gray images are converted into the binary images from the gray image data from the image memory circuit 63, the threshold values from the threshold memory circuit 70, the position data from the maximal and minimal position memory circuit 71. The converted binary images are stored in the binary image memory circuit 73, and are outputted from the output circuit 74 when necessary.

As a method of obtaining the valley point $C_T$ from the histogram maker circuit 66, there are a method of obtaining the $C_T$ for each one scanning line of the horizontal or vertical scanning lines, a method of obtaining one $C_T$ about all the lines of the horizontal or the vertical scanning lines, and a method of obtaining one $C_T$ through the scanning operation of all the lines of the horizontal, vertical scanning line as described in the paragraph of the detailed description of the invention. The construction is omitted in the description as the method is similar to FIG. 10.

Figure 10:
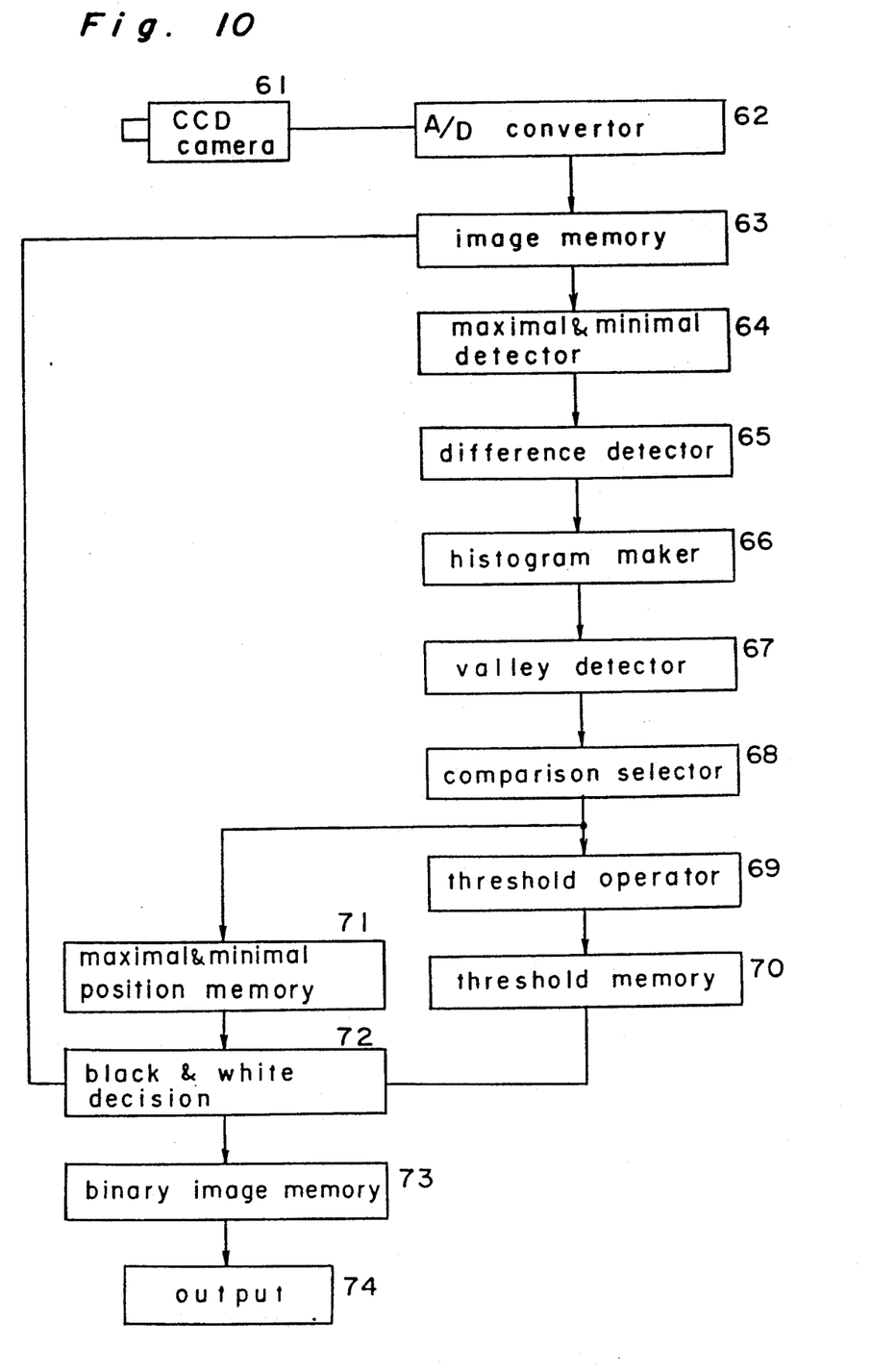
FIG. 10 is a schematic diagram of the arrangement of each circuit in a third embodiment.
Figure 11:
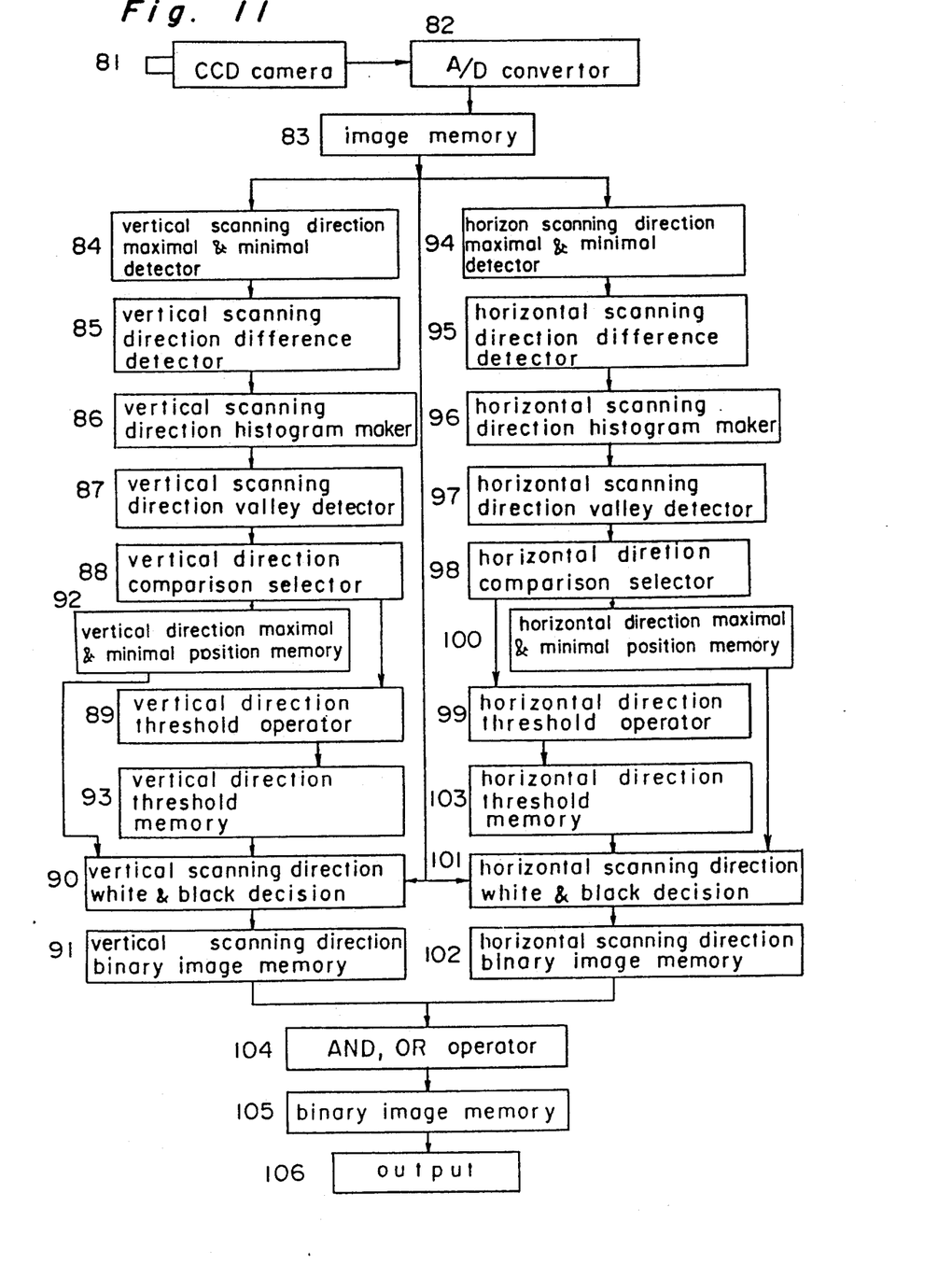
FIG. 11 is a schematic diagram of the arrangement of each circuit in a modified embodiment of FIG. 10.

Although a method of obtaining the binary images from scanning of the horizontal or the vertical direction of the images has been described in the construction of FIG. 10, the construction of FIG. 11 as a modified embodiment thereof shows a procedure of having the logical product or the logical sum between the binary images obtained by the scanning of the horizontal and vertical directions.

In FIG. 11, the construction from 81 to 102 is omitted in the description, because it is the same as FIG. 10. The construction of FIG. 11 includes a CCD camera 81, an A/D convertor circuit 82, an image memory circuit 83, a vertical scanning direction maximal and minimal detector circuit 84, a vertical scanning direction difference detector circuit 85, a vertical scanning direction histogram maker circuit 86, a vertical scanning direction valley detector circuit 87, a vertical direction comparison selector circuit 88, a vertical direction maximal and minimal position memory circuit 92, a vertical direction threshold operator circuit 89, a vertical scanning direction white, black decision circuit 90, a vertical scanning direction binary image memory circuit 91, a vertical direction threshold memory circuit 93, a horizontal scanning direction maximal and minimal detector circuit 94, a horizontal scanning direction difference detector circuit 95, a horizontal scanning direction histogram maker circuit 96, a horizontal scanning direction valley detector circuit 97, a horizontal direction comparison selector circuit 98, a horizontal direction threshold operator circuit 99, a horizontal direction maximal and minimal position memory circuit 100, a horizontal scanning direction white, black decision circuit 101, a horizontal scanning direction binary image memory circuit 102, a horizontal direction threshold memory circuit 103, an AND, OR operator circuit 104, a binary image memory circuit 105, and an output circuit 106.

In the AND, OR operator circuit 104, the operations of the (2), (3) formulas of the second embodiment are applied with the binary image data from the horizontal scanning binary image memory circuit 102 and the vertical scanning binary image memory circuit 91 to obtain the composed binary images. The binary images are stored in the binary image memory circuit 105, and are outputted from the outputting circuit 106 if necessary.

The actual application example by the construction of FIG. 11 is shown in FIG. 12.

FIG. 12(a) shows the gray images taken in from the CCD camera as in the second embodiment. FIG. 12(b) shows the binary images by the conventional binary method, FIG. 12(c) shows the binary images by the binary method, or a method by the logical product, of the present invention.

In the conventional method, the image shape information of the gray images is considerably lost from FIG. 12. According to the present invention, it is found out that the binary images are obtained with a little loss of it.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An image processing method for converting grey images inputted according to horizontal scanning lines and vertical scanning lines from a plurality of image pickup elements into binary images, comprising the steps of:

obtaining maximal values and minimal values of grey scale values for each horizontal scanning line and each vertical scanning line of the inputted gray images;

obtaining threshold values for each horizontal scanning line and each vertical scanning line from the corresponding maximal and minimal values;

obtaining first binary images for each horizontal scanning line and each vertical scanning line from the threshold values; and obtaining composite binary images from a logical product or a logical sum of respective pixels of the first binary images.

2. A method according to claim 1, wherein said first binary images are determined by obtaining a difference between the maximal values and the minimal values for each horizontal or vertical scanning line, composing a histogram of the differences, setting a critical value at a valley of the histogram, and selecting the maximal values and minimal values where the difference is larger than the critical value at the valley point.

3. An image processing method for converting grey images inputted according to horizontal scanning lines and vertical scanning lines from a plurality of image pickup elements into binary images, comprising the steps of:

obtaining maximal values and minimal values of grey scale values for each horizontal scanning line or each vertical scanning line;

obtaining a difference between the maximal values and the minimal values for each horizontal or vertical scanning line;

composing a histogram of the differences ($\Delta a$);

setting a critical value at a valley point of the histogram;

selecting the maximal values and minimal values where the difference is larger than the critical value at the valley point;

obtaining threshold values from the maximal and minimal values for each horizontal or vertical scanning line; and obtaining the binary image from the threshold values.

4. An image processing apparatus having a mechanism converting gray images inputted according to horizontal scanning lines and vertical scanning lines from a plurality of image pickup elements into binary images, comprising:

means for obtaining maximal and minimal values of grey scale values for each horizontal scanning line and each vertical scanning line of the inputted gray images;

means for obtaining threshold values from the maximal and minimal values for each horizontal and vertical scanning line;

means for obtaining a first binary image for each horizontal scanning line and each vertical scanning line from the threshold values; and means for obtaining a composite binary image from the logical product or the logical sum of respective pixels of the first binary images for each horizontal and vertical scanning line.

5. An apparatus according to claim 4, wherein said means for obtaining a first binary image for each horizontal scanning line and each vertical scanning line includes means for creating a histogram of an absolute value of a difference between the maximal value and minimal value, and means for setting a critical value at a valley point of the histogram.

6. An apparatus according to claim 5, wherein said means for obtaining a first binary image for each horizontal scanning line and each vertical scanning line further includes means for selecting the maximal values and minimal values where the absolute value of the difference is larger than the critical value at the valley point.

7. An image processing apparatus having a mechanism for converting gray images, inputted according to horizontal scanning lines and vertical scanning lines from a plurality of image pickup elements, into binary images, comprising:
   means for obtaining maximal values and minimal values of grey scale values for each horizontal scanning line or each vertical scanning line of the inputted gray images;
   means for creating a histogram of an absolute value of a difference between the maximal value and minimal value; and
   means for setting a critical value at a valley point of the histogram.

* * * * *